(12) United States Patent
Yasuda et al.

(10) Patent No.: US 12,469,407 B2
(45) Date of Patent: Nov. 11, 2025

(54) SYSTEMS AND METHODS FOR TRAINING DRIVERS VIA VEHICLE LIGHT CONTROL

(71) Applicant: Toyota Research Institute, Inc., Los Altos, CA (US)

(72) Inventors: Hiroshi Yasuda, San Francisco, CA (US); Jean Marcel dos Reis Costa, San Jose, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 24 days.

(21) Appl. No.: 18/319,960

(22) Filed: May 18, 2023

(65) Prior Publication Data

US 2024/0386814 A1 Nov. 21, 2024

(51) Int. Cl.
| | |
|---|---|
| G09B 19/00 | (2006.01) |
| B60Q 1/50 | (2006.01) |
| B60Q 3/70 | (2017.01) |
| G09B 19/16 | (2006.01) |
| H05B 47/115 | (2020.01) |

(52) U.S. Cl.
CPC ............. G09B 19/167 (2013.01); B60Q 1/50 (2013.01); B60Q 3/70 (2017.02); H05B 47/115 (2020.01)

(58) Field of Classification Search
CPC ......... G09B 9/042; G09B 19/167; B06Q 3/70
See application file for complete search history.

(56) References Cited

U.S. PATENT DOCUMENTS

| | | | |
|---|---|---|---|
| 9,550,500 B2 | 1/2017 | Hackenberg et al. | |
| 10,093,229 B2 | 10/2018 | Baker et al. | |
| 10,173,582 B2 | 1/2019 | Salter et al. | |
| 2014/0191883 A1 | 7/2014 | Bolton et al. | |
| 2015/0004572 A1* | 1/2015 | Bomer | G09B 9/042 434/219 |
| 2016/0163217 A1* | 6/2016 | Harkness | G09B 7/00 434/65 |
| 2017/0039870 A1* | 2/2017 | Ellis | G09B 9/04 |
| 2017/0294060 A1 | 10/2017 | Lonski et al. | |
| 2018/0086259 A1 | 3/2018 | Bel et al. | |
| 2018/0322715 A1* | 11/2018 | Toyoda | G02B 27/0101 |
| 2019/0243370 A1* | 8/2019 | Li | B60W 30/095 |
| 2019/0366844 A1 | 12/2019 | Yoon et al. | |
| 2021/0192975 A1* | 6/2021 | Spence | G01C 21/365 |
| 2021/0261050 A1 | 8/2021 | Sobhany | |
| 2023/0343240 A1* | 10/2023 | Camhi | G07C 5/02 |

FOREIGN PATENT DOCUMENTS

WO 2022174997 A1 8/2022

* cited by examiner

*Primary Examiner* — Peter R Egloff
(74) *Attorney, Agent, or Firm* — Christopher G. Darrow; Darrow Mustafa PC (57) ABSTRACT

Systems, methods, and other embodiments described herein relate to training a vehicle driver based on in-cabin or external light triggers. In one embodiment, a system includes a processor and a memory storing machine-readable instructions. The instructions, when executed by the processor, cause the processor to monitor a vehicle location along a roadway. A map of the roadway indicates a target location for a driving maneuver to be performed. When the vehicle location is within a threshold distance from a target location on the map, the instructions, when executed by the processor, cause the processor to control a vehicle light based on a vehicle light setting associated with the driving maneuver.

20 Claims, 6 Drawing Sheets

SYSTEMS AND METHODS FOR TRAINING DRIVERS VIA VEHICLE LIGHT CONTROL

TECHNICAL FIELD

The subject matter described herein relates, in general, to training vehicle drivers to perform certain driving maneuvers and, more particularly, to control in-cabin or external vehicle lights to prompt a driver to perform a driving maneuver at a particular location on a roadway.

BACKGROUND

Vehicle operation can be a daunting task for an individual without driving experience. Moreover, some advanced vehicle maneuvers may be challenging to master, even for experienced drivers. Whether new or experienced, drivers may spend hours in a vehicle or simulator learning to operate the vehicle properly. Training aids teach drivers how to operate vehicles and perform driving maneuvers. For example, performance driving programs teach drivers to perform advanced maneuvers, such as high-speed cornering, take-overs, and overall navigation of a racetrack. A human instructor may be seated in the vehicle along with the driver to provide verbal instruction. In another example, the instructor is in a leading vehicle and selects the target path that the training driver in a following vehicle is to follow. In addition to showing the target path, the instructor demonstrates driving maneuvers, such as acceleration and braking, etc., to enhance race performance.

In general, enhancements to the instruction interface increase the efficiency and efficacy of driver training programs. For example, a human instructor is prone to making mistakes and the efficacy of communicating the instructions is limited by both the human instructor and the human driver. While a lead vehicle may be able to demonstrate a target path along the track, the lead vehicle by itself may not communicate the target control operations of the vehicle, i.e., hand-braking, clutching, acceleration, etc.

SUMMARY

In one embodiment, example systems and methods relate to a manner of improving driver performance on a roadway by prompting a driver to perform certain driving maneuvers via manipulating vehicle lights to capture the driver's attention.

In one embodiment, a light control system for training vehicle driver behavior via internal and/or external light control is disclosed. The light control system includes one or more processors and a memory communicably coupled to the one or more processors. The memory stores instructions that, when executed by the one or more processors, cause the one or more processors to monitor a vehicle's location along a roadway. A map of the roadway indicates a target location for a driving maneuver to be performed. When the vehicle location is within a threshold distance from the target location on the map, the instructions, when executed by the one or more processors, cause the one or more processors to control a vehicle light based on a vehicle light setting associated with the driving maneuver.

In one embodiment, a non-transitory computer-readable medium for training vehicle driver behavior via internal and/or external light control and including instructions that, when executed by one or more processors, cause the one or more processors to perform one or more functions is disclosed. The instructions include instructions to monitor a vehicle location along a roadway. A map of the roadway indicates a first driving maneuver to perform at a first target location and a second driving maneuver to perform at a second target location. When the vehicle location is within a threshold distance from the first target location on the map, the instructions, when executed by one or more processors, cause the one or more processors to control a vehicle light based on a first vehicle light setting associated with the first driving maneuver. When the vehicle location is within a threshold distance from the second target location on the map, the instructions, when executed by one or more processors, cause the one or more processors to control a vehicle light based on a second vehicle light setting associated with the second driving maneuver.

In one embodiment, a method for training vehicle driver behavior via internal and/or external light control is disclosed. In one embodiment, the method includes monitoring a vehicle location along a roadway. A map of the roadway indicates a target location for a driving maneuver to be performed. The method also includes determining when the vehicle location is within the threshold distance from the target location on the map and when the vehicle location is within the threshold distance from the target location, controlling a vehicle light based on a vehicle light setting associated with the driving maneuver.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving driver training through vehicle light control are disclosed herein. As previously described, current performance driving programs employ a human instructor seated in the vehicle along with a training driver or in a lead vehicle in front of the vehicle. In either case, the intent is that the human instructor provides instruction to the training driver regarding the driving maneuvers, whether they be basic maneuvers for a first-time driver or advanced maneuvers for an experienced driver. The driving instructor may provide instruction regarding the timing of certain operations (i.e., braking, acceleration, steering, clutching, etc.). The subject matter of the present application provides a different form of training that provides timing instruction using existing passenger cabin lights or other lighting elements as a cue.

Specifically, the light control system includes a map of a roadway. The map identifies target locations along the roadway where certain driving maneuvers are to be executed. For example, the map may indicate a curve where a driver should apply brake pressure to achieve optimal conditions through the curve. At the end of the curve, the map may define a second target location where the user should accelerate the vehicle. In other words, the map identifies target locations along a roadway where a driver is to perform certain operations to navigate the course in a particular fashion.

The light control system then alters the vehicle lights based on the vehicle approaching the target location. For example, the light control system may flash an interior cabin light when the vehicle reaches the first target location (i.e., where brake pressure is to be applied). That is, the light control system uses vehicle lights such as cabin lights, headlights, and/or display illumination (e.g., an infotainment display, instrument cluster, etc.) to communicate timing for driving maneuvers, such as braking and acceleration, among others. The light control system is generally aware of when the driver should be performing different driving maneuvers through mappings with the surroundings and the current trajectory of the vehicle. Thus, the light control system dynamically adjusts the various light-centric aspects of the vehicle to cue a specific driving maneuver associated with a target location. In one example, the vehicle light control is uniquely associated with a particular driving maneuver. For example, the vehicle light may emanate different colors for different driving maneuvers such as braking, accelerating, clutching, shifting, and steering. In this way, the disclosed systems, methods, and other embodiments improve driver training by exploiting a driver's natural sensitivity to changes in lighting conditions to cue certain driving maneuvers.

Figure 1:
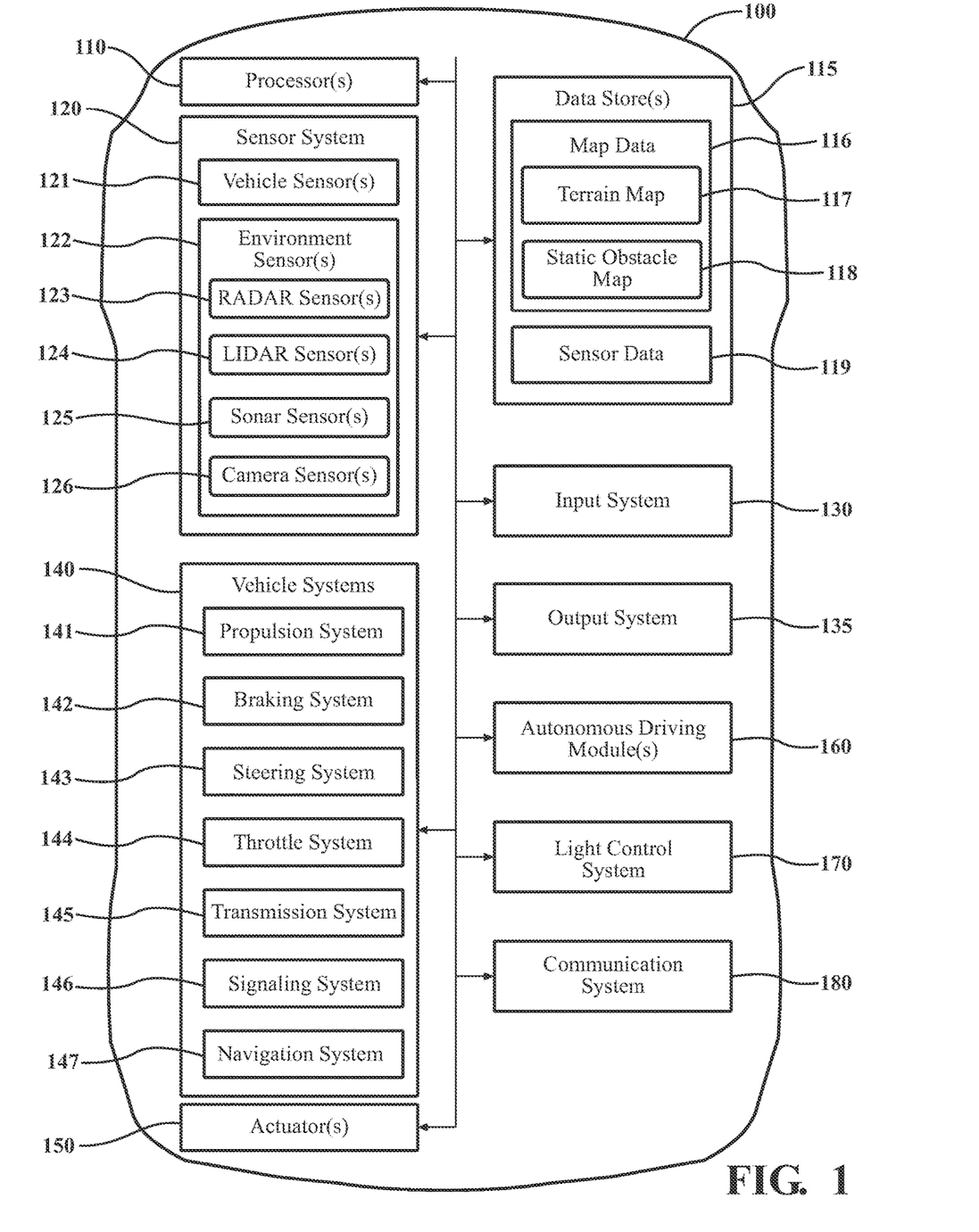
FIG. 1 illustrates one embodiment of a vehicle within which systems and methods disclosed herein may be implemented.

Referring to FIG. 1, an example of a vehicle 100 is illustrated. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that, for example, includes sensors to perceive aspects of the surrounding environment, and thus benefits from the functionality discussed herein associated with training driving behavior via vehicle light controls.

The vehicle 100 also includes various elements. It will be understood that in various embodiments it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes a light control system 170 that is implemented to perform methods and other functions as disclosed herein relating to improving driving training by controlling various light elements of the vehicle 100.

Figure 2:
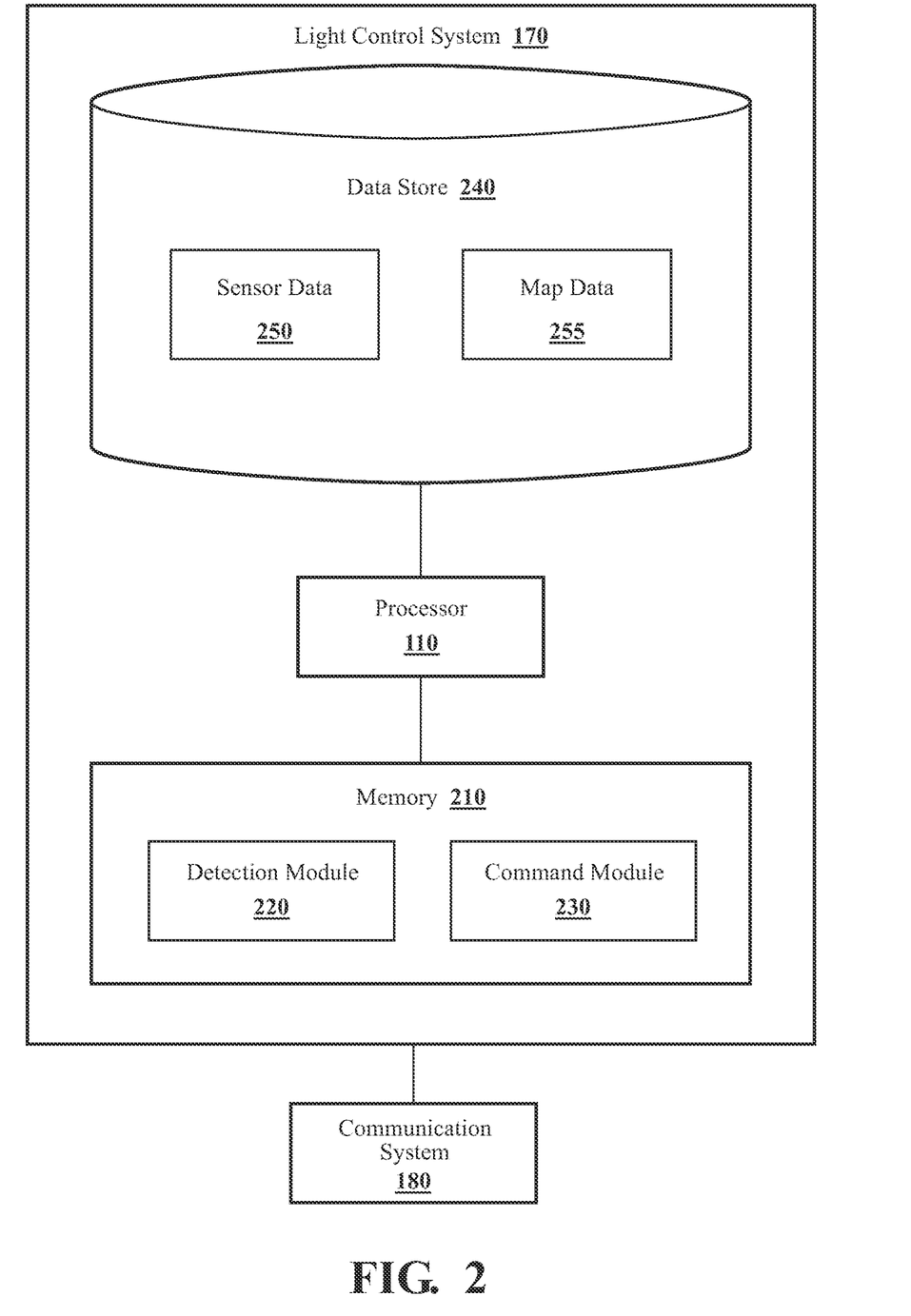
FIG. 2 illustrates one embodiment of a light control system that is associated with training a vehicle driver via vehicle light control.

With reference to FIG. 2, one embodiment of the light control system 170 of FIG. 1 is further illustrated. The light control system 170 is shown as including a processor 110 from the vehicle 100 of FIG. 1. Accordingly, the processor 110 may be a part of the light control system 170, the light control system 170 may include a separate processor from the processor 110 of the vehicle 100, or the light control system 170 may access the processor 110 through a data bus or another communication path that is separate from the vehicle 100. In one embodiment, the light control system 170 includes a memory 210 that stores a detection module 220 and a command module 230. The memory 210 is a random-access memory (RAM), read-only memory (ROM), a hard-disk drive, a flash memory, or another suitable memory for storing the modules 220 and 230. The modules 220 and 230 are, for example, computer-readable instructions that when executed by the processor 110 cause the processor 110 to perform the various functions disclosed herein. In alternative arrangements, the modules 220 and 230 are independent elements from the memory 210 that are, for example, comprised of hardware elements. Thus, the modules 220 and 230 are alternatively ASICs, hardware-based controllers, a composition of logic gates, or another hardware-based solution.

Moreover, in one embodiment, the light control system 170 includes the data store 240. The data store 240 is, in one embodiment, an electronic data structure stored in the memory 210 or another data storage device and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 stores the sensor data 250 along with, for example, metadata that characterizes various aspects of the sensor data 250. For example, the metadata can include location coordinates (e.g., longitude and latitude), relative map coordinates or tile identifiers, time/date stamps from when the separate sensor data 250 was generated, and so on.

The sensor data 250 includes data collected from a sensor system 120 of the vehicle 100 and used to determine the location of the vehicle 100. Before a particular driving maneuver cue is generated, the light control system 170 determines whether the vehicle 100 is in a location where such a cue should be provided. The sensor data 250 is compared to map data 255 when making this determination.

The sensor data 250 may take a variety of forms. For example, the sensor data 250 may be data from vehicle sensors 121 about the vehicle position. Examples of vehicle sensors 121 include accelerometers, gyroscopes, an inertial measurement unit (IMU), a dead-reckoning system, a global navigation satellite system (GNSS), a global positioning system (GPS), and/or other sensors for monitoring aspects of the vehicle 100. As a specific example, the sensor data 250 may be GPS coordinates for the vehicle 100. In this example, the GPS coordinates for the vehicle 100 are compared to those for target locations along the roadway.

In another example, the sensor data 250 may be images or the output of other environment sensors 122 that detect roadway structures, features, and/or landmarks. Examples of environment sensors 122 include radar sensors 123, LIDAR sensors 124, sonar sensors 125 (e.g., ultrasonic sensors), and/or cameras 126 (e.g., monocular, stereoscopic, RGB, infrared, etc.). As a specific example, the roadway may have a curve with a particular radius of curvature. A camera 126 of the vehicle 100 captures an image of the curve as the vehicle 100 approaches. This captured image is compared against the map data 255, which also includes images of the curve, to identify when the vehicle 100 is at the curve. In other words, the map data 255, combined with the images provided by the camera 126, allows the light control system 170 to determine the location of the vehicle 100 along the roadway.

The sensor data 250 may also include images that depict one or more static obstacles, which are physical objects whose position and general attributes do not substantially change over a period of time. Examples of static obstacles include trees, buildings, curbs, fences, and so on. In this example, the image capture of static obstacles along a roadway is compared against comparative map data 255 to localize the vehicle 100.

The data store 240 further includes map data 255, which includes data about the roadway. The map data 255, depicted in FIG. 2, is an example of the map data 116 depicted in FIG. 1 and described in detail below. The map data 255 includes information against which the sensor data 250 is compared to determine the vehicle 100 location relative to the target locations. That is, the map data 255 includes localizing information for the target locations. For example, the map data 255 may include coordinates of the target locations against which the coordinates of the vehicle 100 are compared to determine the relative position of the vehicle 100 to the target locations. In another example, the map data 255 includes information about static obstacles along the roadway. In this example, sensor data 250 related to detected static objects is compared against static object map data 255 to determine the location of the vehicle 100 along the roadway. While particular reference is made to particular forms of the sensor data 250 and the map data 255, the data in the data store 240 may be of a variety of forms which allow the light control system 170 to locate the vehicle 100 relative to the target locations along the roadway.

The map data 255 also identifies a driving maneuver to perform at target locations. The vehicle 100 includes a variety of human-machine interfaces (HMIs) that receive input to control the vehicle 100. For example, the vehicle 100 may include a steering wheel, an accelerator pedal, a brake pedal, a hand brake, and a clutch pedal. It may be desirable that the HMIs are operated in a certain way at specific locations along a roadway. For example, acceleration may be desired as a vehicle approaches a straight section of a roadway. In another example, a clutch, brake, and steering wheel are engaged to direct the vehicle 100 around a turn. As such, the map data 255 includes a mapping between target locations and driving maneuvers to perform at those target locations.

The driving maneuver associated with a particular target location may be determined in various ways. In an example, the driving maneuver to be performed is based on historically-collected data from a user navigating the roadway. For example, an expert driver familiar with the course may navigate the roadway. Sensors on the test vehicle may be used to determine where and how the expert driver actuated certain HMIs of the test vehicle (e.g., steering wheel, brake pedal, accelerator pedal, etc.) during navigation. The driving maneuvers performed by the expert driver are tied to the location where such maneuvers were performed. The map is populated with this control information and used as a cue when a subsequent vehicle 100 passes by the same location.

In an example, the driving maneuver to be performed is a model-based driving maneuver based on machine-learning simulated navigation of the roadway. That is, a computer model may simulate a target (e.g., optimized) path around the roadway. Along with designating the target path, the simulator identifies the driving maneuvers. In this example, the simulator may be a machine-learning system that determines the target path around the track and the associated driving maneuvers using vehicle and track parameters and a machine-learning algorithm. In this way, the map data 255 represents a simulated output of a target (e.g., optimized) path, and associated driving maneuvers, for the roadway.

In another example, the target locations and associated driving maneuvers are manually input by a user. In this example, a driving instructor may input the location along the roadway where certain driving maneuvers are to be executed and what those certain driving maneuvers are. The map is populated with this information and used as a user cue when a subsequent vehicle 100 passes by the same location.

As described above, lighting controls cue the user to perform the driving maneuver. As such, the map data 255 includes a mapping between driving maneuvers and vehicle light controls. That is, the map data 255 includes vehicle light settings associated with a particular driving maneuver. For example, to prompt a user to perform a braking operation, the vehicle light may flash at a particular rate, increase brightness, or emanate a particular color. In an example, each driving maneuver may be particularly and uniquely associated with a distinct vehicle light setting. For example, different driving maneuvers may be prompted by illuminating the vehicle light with different colors. Specifically, a braking maneuver may be indicated by a red light, while vehicle acceleration may be indicated with a green light. All this information is included in the map data 255. While particular reference is made to particular vehicle light settings, the map data 255 may indicate various vehicle light settings to cue various driving maneuvers.

With continued reference to FIG. 2, the detection module 220 generally includes instructions that function to control the processor 110 to receive data inputs from one or more sensors of the vehicle 100. As described above, the inputs are, in one embodiment, observations of one or more objects in an environment proximate to the vehicle 100 and/or other aspects about the surroundings. As provided for herein, the detection module 220, in one embodiment, acquires sensor data 250 that includes at least camera images from which a vehicle 100 location may be determined, as described above. In further arrangements, the detection module 220 acquires the sensor data 250 from further sensors such as a radar 123, a LiDAR sensor 124, and other sensors as may be suitable for identifying the location of the vehicle 100.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

The sensor data 250 may include, for example, information about the location of the vehicle 100 along the roadway, and so on. Moreover, the detection module 220, in one embodiment, controls the sensors to acquire the sensor data 250 about an area that encompasses 360 degrees about the vehicle 100 in order to provide a comprehensive assessment of the surrounding environment. Of course, in alternative embodiments, the detection module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Additionally, the detection module 220, in one embodiment, includes instructions that cause the processor 110 to monitor a vehicle location along a roadway based on the sensor data 250 and the map data 255. The detection module 220 can include one or more devices, applications, and/or combinations thereof to determine the geographic location of the vehicle 100 and/or to determine the relative position of the vehicle 100 to the target locations. The detection module 220 may include or at least provide a connection to a global positioning system, a local positioning system, or a geolocation system. In an example, the detection module 220 includes the navigation system 147 depicted in FIG. 1 and described in more detail below.

In an example, the sensor data 250 and the map data 255 may be coordinate location-based. That is, the sensor data 250 may indicate vehicle 100 location via coordinates and the map data 255 may indicate the target locations via coordinates. In this example, the processor 110 compares the coordinate data of the vehicle 100 (as indicated in the sensor data 250) to coordinate data for target locations (as indicated in the map data 255) to determine when the vehicle is within a threshold distance from the target location.

In another example, the detection module 220 may be vision-based. For example, the sensor data 250 may include images, or other sensor output, which indicate characteristics of the roadway and/or the static objects in the surrounding environment. The map data 255 similarly includes images, or other data, which indicate characteristics of the roadway and/or static objects in the surrounding environment. In this example, the processor 110 compares data from the environmental sensors 122 of the vehicle 100 to environment data in the map data 255 to determine when the vehicle location is within a threshold distance from the target location.

In yet another example, the detection module 220 monitors and identifies the location of the vehicle 100 based on data received through a vehicle-to-infrastructure (V2I) communication network. In this example, various transceiver beacons are placed at target locations along the roadway. The vehicle 100 includes a corresponding transceiver that communicates with the beacons. Based on signal transmission between the vehicle and the beacon, the detection module 220 identifies the location of the vehicle 100 along the roadway. While particular reference is made to specific methods of identifying the location of the vehicle 100, other mechanisms, or combinations of mechanisms including those described above, may be used to determine the location of the vehicle 100.

The command module 230, in one embodiment, includes instructions that cause the processor 110 to control a vehicle light based on a vehicle light setting associated with the driving maneuver. The command module 230 includes the hardware and software components to generate electrical signals that control the vehicle light illumination characteristics based on the output of the detection module 220 and the map data 255, as described above.

In an example, the control over the vehicle light is based on the particular driving maneuver. That is, the map data 255 may indicate a first driving maneuver to perform at a first target location and a second driving maneuver, that is different from the first driving maneuver, to perform at a second target location. When the vehicle location is within a threshold distance from the first target location, the command module 230 controls a vehicle light based on a first vehicle light setting associated with the first driving maneuver. When the vehicle location is within a threshold distance from the second target location, the command module 230 controls a vehicle light based on a second vehicle light setting associated with the second driving maneuver. In this example, the second vehicle light setting is different from the first vehicle light setting. That is, different vehicle light settings may be uniquely associated with different driving maneuvers such that the light control system 170 can cue multiple driving maneuvers.

In an example, the command module 230 controls the vehicle light based on a difference between the driving maneuver and a user command. For any given driving maneuver, the command may have any number of incremental values. For example, a driver may apply light or heavy brake pressure. As another example, a driver may turn the steering wheel by any incremental amount. The map data 255, in addition to identifying a type of driving maneuver, may also indicate the intensity of the driving maneuver to be performed at a particular target location. In this example, the difference between what the driver is doing and the indicated intensity dictates the vehicle light control.

As a specific example, the intensity of the vehicle light control is proportional to the difference between the driving maneuver and the user command. For example, the map data 255 may indicate that the user rotates a steering wheel by a specified amount as a user navigates a turn. As the user enters the turn, the vehicle light may begin to flash at a first rate based on a difference between the amount the user is rotating the steering wheel and the target amount. This prompts the user to rotate the steering wheel further. As the driver continues to rotate the steering wheel, the flashing rate may decrease, signaling to the driver that they still need to adjust the steering wheel rotation, but are approaching the target value.

In addition to activating certain vehicle lights based on a driving maneuver to be performed. the command module 230 also returns the vehicle lights to a pre-maneuver state. For example, a vehicle light may initially be turned off or emanating with particular characteristics. Based on an upcoming driving maneuver, the command module 230 alters the emission characteristics of the vehicle light to cue the driving maneuver. Then based on any criteria, the command module 230 may return the vehicle light to its previous state (e.g., turned off or emanating with pre-maneuver settings).

In one example, the command module 230 returns the vehicle light to a pre-maneuver state based on the vehicle location passing the target location. In another example, the command module 230 returns the vehicle light to a pre-maneuver state based on a driver performing the driving maneuver. That is, the intent of the vehicle light is to prompt a driver to perform a particular driving maneuver. As such, when the vehicle location passes the target location and/or the driver performs the driving maneuver, the purpose for providing the visual cue is removed such that the driving maneuver-specific light control is discontinued.

In an example, the command module 230 also blocks vehicle illumination. More specifically, responsive to a driver performing a driving maneuver at a target location, the command module 230 blocks the vehicle light control based on a maneuver-based vehicle light setting. For example, an optimal or target operation of the vehicle 100 may dictate the application of brake pressure and turning the steering wheel to a certain degree while navigating a turn of the roadway. As such, when the vehicle 100 is at the turn, it may be expected that the command module 230 generates a light control signal to prompt these driving maneuvers. However, if vehicle sensors 121 associated with a brake pedal and a steering wheel indicate the driver is already performing these driving maneuvers, no visual cue is necessary and may distract the driver. In this example, the command module 230 blocks the maneuver-based light command.

In one or more configurations, the light control system 170 implements one or more machine learning algorithms. As described herein, a machine learning algorithm includes but is not limited to deep neural networks (DNN), including transformer networks, convolutional neural networks, recurrent neural networks (RNN), etc., Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the light control system 170 or another system generally trains the machine learning algorithm according to a particular training approach, which may include supervised training, self-supervised training, reinforcement learning, and so on. In contrast to training/learning of the machine learning algorithm, the light control system 170 implements the machine learning algorithm to perform inference. Thus, the general use of the machine learning algorithm is described as inference.

Moreover, the light control system 170, as provided for within the vehicle 100, functions in cooperation with a communication system 180. Via the communication system 180, the light control system 170 receives sensor data 250 from the sensor system 120 in accordance with the principles described herein. Moreover, via the communication system 180, the command module 230 passes control signals to the vehicle lights in accordance with the principles described herein.

In an example, the communication system 180 includes a physical bus or busses to transmit information between connected components. In an example, the communication system 180 is a wireless system communicating with associated components according to one or more wireless communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, DSRC, or another suitable protocol for communicating between the light control system 170 and other entities in the vehicle 100. In any case, the light control system 170 can leverage various wireless communication technologies to provide communications to other components of the vehicle 100.

Figure 3:
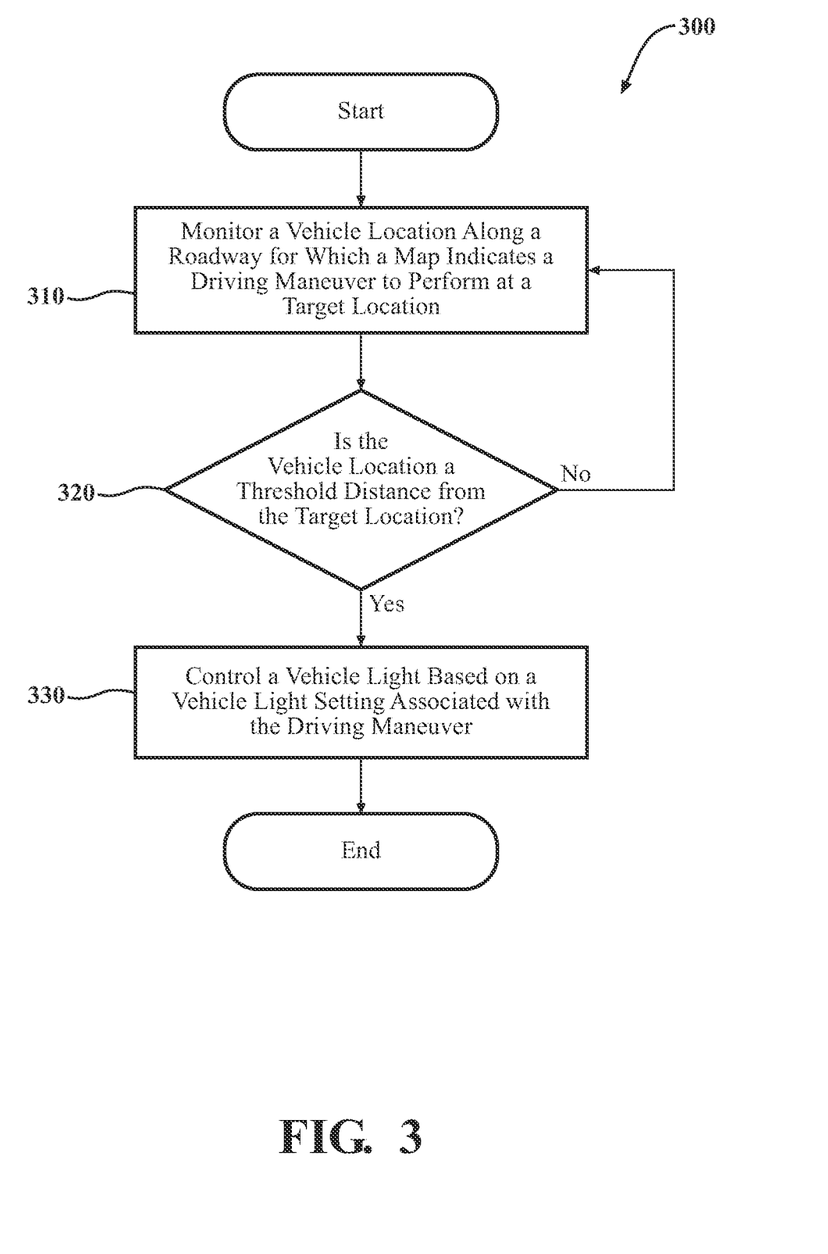
FIG. 3 illustrates a flowchart for one embodiment of a method that is associated with training a vehicle driver via vehicle light control.

Additional aspects of driver training via vehicle light control will be discussed in relation to FIG. 3. FIG. 3 illustrates a flowchart of a method 300 that is associated with controlling vehicle lights to train a driver to operate a vehicle along a roadway. Method 300 will be discussed from the perspective of the light control system 170 of FIGS. 1 and 2. While method 300 is discussed in combination with the light control system 170, it should be appreciated that the method 300 is not limited to being implemented within the light control system 170 but is instead one example of a system that may implement the method 300.

At 310, the detection module 220 controls the sensor system 120 to acquire the sensor data 250. In one embodiment, the detection module 220 controls the radar sensor 123 and the camera 126 of the vehicle 100 to observe the surrounding environment. Alternatively, or additionally, the detection module 220 controls the camera 126 and the LiDAR sensor 124 or another set of sensors to acquire the sensor data 250. As part of controlling the sensors to acquire the sensor data 250, it is generally understood that the sensors acquire the sensor data 250 of a region around the ego vehicle 100 with data acquired from different types of sensors generally overlapping in order to provide for a comprehensive sampling of the surrounding environment at each time step. In general, the sensor data 250 need not be of the exact same bounded region in the surrounding environment, but should include a sufficient area of overlap such that distinct aspects of the area can be correlated. Thus, the detection module 220, in one embodiment, controls the sensors to acquire the sensor data 250 of the surrounding environment. The detection module 220 also controls the environment sensors 122 to collect data regarding the operation of the vehicle 100. For example, the detection module 220 controls the monitors of various actuators 150 and components of the various vehicle systems 140.

Moreover, in further embodiments, the detection module 220 controls the sensors to acquire the sensor data 250 at successive iterations or time steps. Thus, the light control system 170, in one embodiment, iteratively executes the functions discussed at blocks 310-320 to acquire the sensor data 250 and provide information therefrom. Furthermore, the detection module 220, in one embodiment, executes one or more of the noted functions in parallel for separate observations in order to maintain updated perceptions. Additionally, as previously noted, the detection module 220, when acquiring data from multiple sensors, fuses the data together to form the sensor data 250 and to provide for improved determinations of detection, location, and so on.

The detection module 220 monitors a vehicle location along a roadway. As described above, a map of the roadway indicates a driving maneuver to perform at a target location. At step 320, the detection module 220 determines when the vehicle location is within a threshold distance from the target location. As described above, this is based on sensor data 250 collected from the vehicle and map data 255 of the roadway. Specifically, the sensor data 250 includes information that indicates the location of the vehicle 100. Similarly, the map data 255 includes corresponding information regarding the target locations of the roadway. As such, the detection module 220 compares the sensor data 250 with the respective map data 255 to determine the relative position of the vehicle 100 to the target location. If the vehicle 100 is greater than a threshold distance from the target location, the detection module 220 continues to monitor the vehicle location until the vehicle location is within a threshold distance of any of the target locations identified in the map data 255.

At 330, when the vehicle location is within a threshold distance from a target location, the command module 230 controls a vehicle light based on a vehicle light setting associated with the driving maneuver. As described above, the map data 255 associates specific light controls with particular driving maneuvers. Accordingly, when a vehicle is at a location, a particular driving maneuver is identified. The command module 230, via the communication system 180, controls a vehicle light based on the vehicle light setting associated with the identified driving maneuver.

While particular reference has been made to particular lighting controls, a variety of lighting controls may be implemented in accordance with the principles described herein, including the brightness of emitted light, the color of emitted light, the frequency of flashing of the emitted light, and a number of lighting devices that are activated. As such, the present method 300 describes a way in which a driver can be prompted to perform a particular driving maneuver (e.g., braking, acceleration, steering, clutching, shifting, etc.) at particular locations along a roadway to achieve a particular purpose (e.g., safe driving, reduced lap time).

Figure 4:
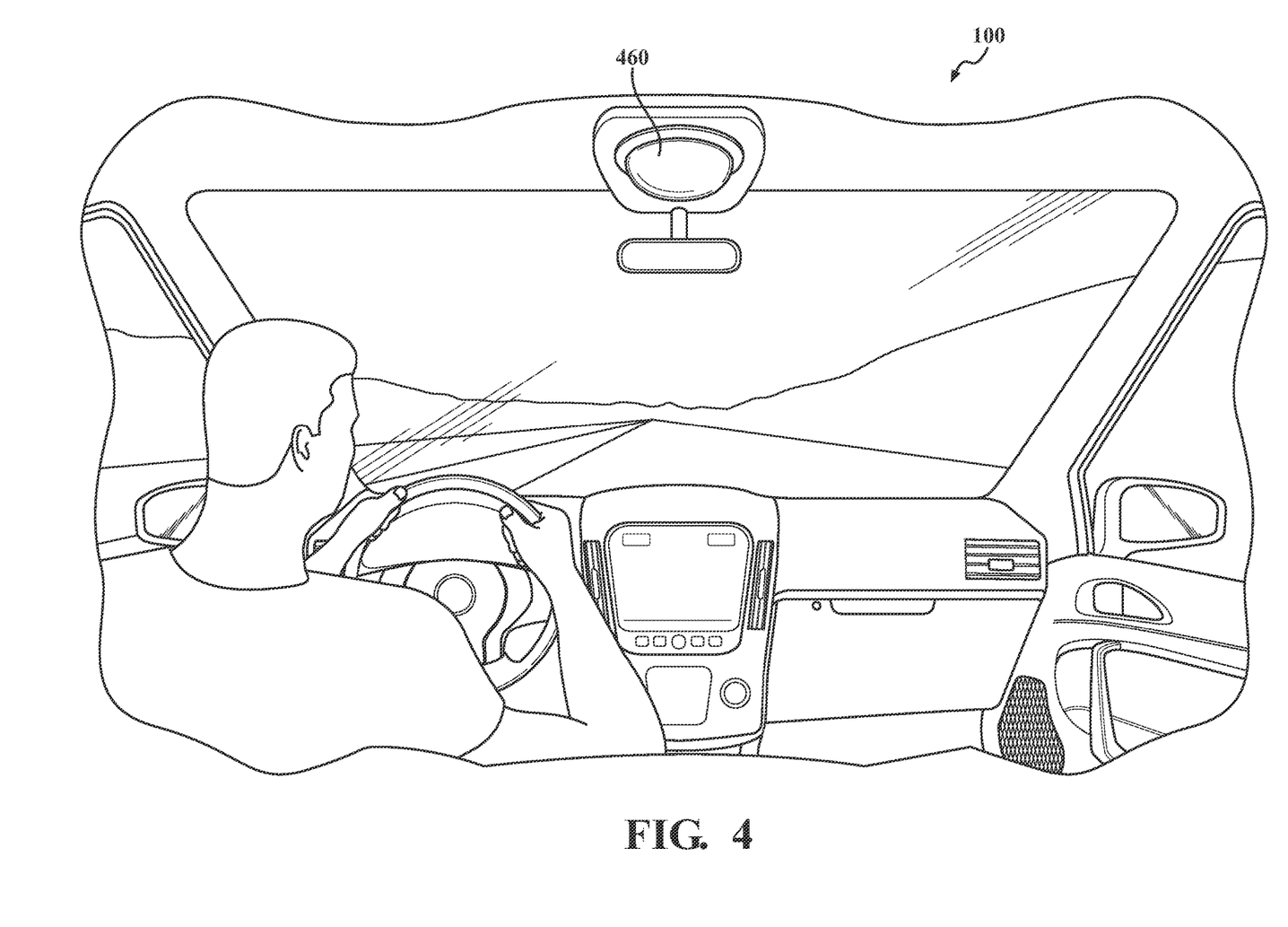
FIG. 4 illustrates an environment of training a vehicle driver via light control.

FIG. 4 illustrates an environment for training a vehicle driver via vehicle light control. As described, the light control system 170 manipulates a vehicle light 460 to prompt drivers to perform certain driving maneuvers as they navigate a roadway. In the example depicted in FIGS. 4 and 5, the target location is a curve in the road, the driving maneuver is a braking maneuver, and the vehicle light setting is to flash an interior light. FIG. 4 depicts the vehicle 100 at a location removed from the curve, such that the vehicle light 460 is not activated.

While FIG. 4 depicts the vehicle light 460 as a dome light within the vehicle 100, the vehicle light 460 may be any of a variety of interior or exterior lights. As specific examples of interior lights, the vehicle light 460 may be a cabin light, an infotainment display, and an instrument cluster, among others. The vehicle light 460 may also be an exterior light of the vehicle, such as headlights. Using external nights to provide the cue may aid driver training in low-light conditions, such as night racing. While particular reference is made to various vehicle lights, the light control system 170 may control any one, or multiple, of the aforementioned lights or other lights in the vehicle 100 to prompt a driving maneuver.

Figure 5:
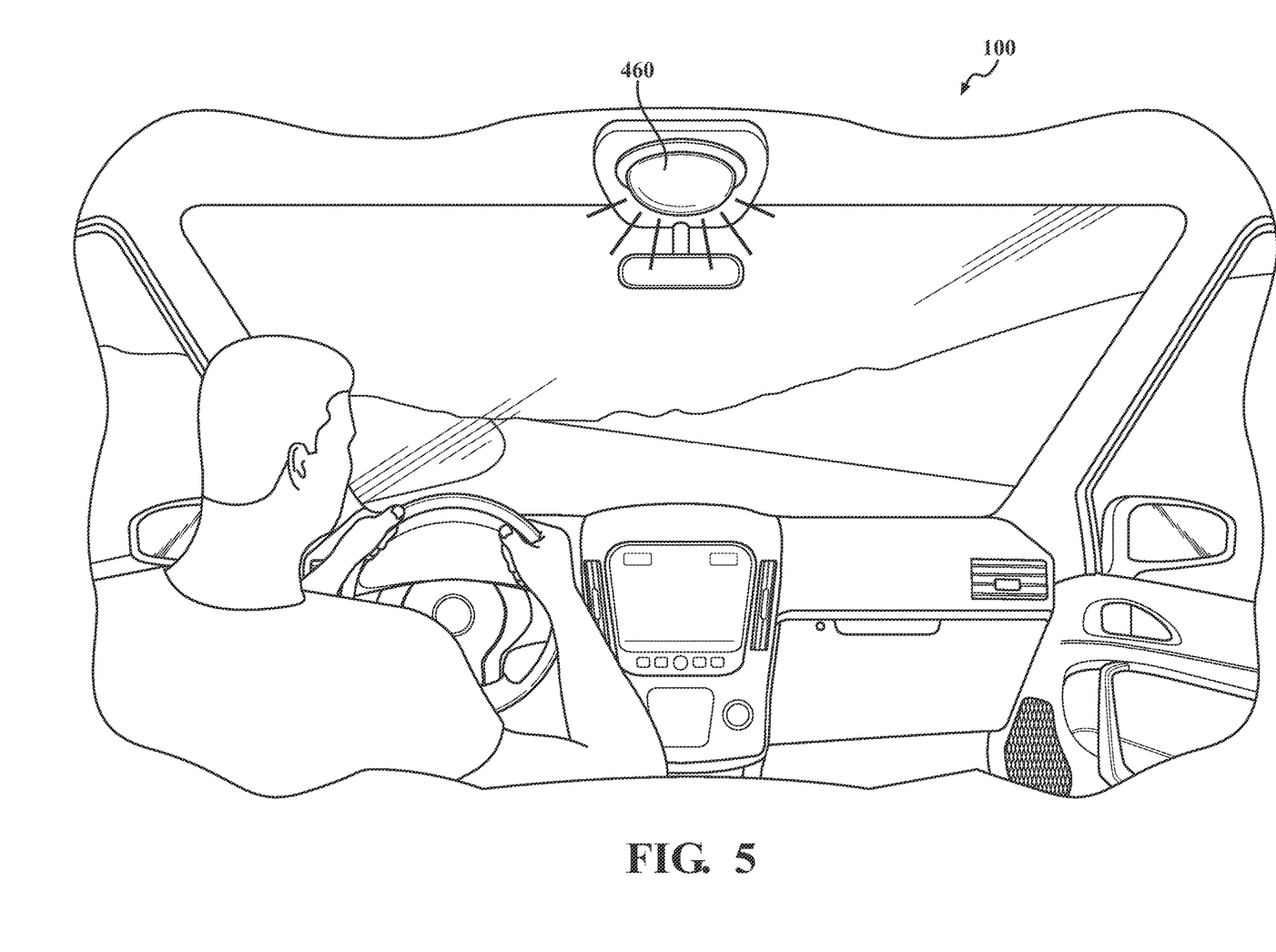
FIG. 5 illustrates an environment of training a vehicle driver via light control.

FIG. 5 illustrates an environment for training a vehicle driver via vehicle light control. As depicted in FIG. 5, the vehicle 100 is approaching a target location, i.e., the turn of the road. As such, the light control system 170 activates the vehicle light 460 to illuminate via specific vehicle light settings as described above. Specifically, the detection module 220 determines that the vehicle 100 is within a threshold distance of the turn and the command module 230 identifies that the driver should perform a braking maneuver to achieve optimal performance. The command module 230 then identifies a particular vehicle light setting associated with the braking maneuver and activates the vehicle light 460 to illuminate in accordance with the setting. The driver is sensitive to visual changes in the environment such that the flashing of the vehicle light 460 catches the driver's attention. Knowing the relationship between the visual indicia and an instructed maneuver, the driver turns the vehicle 100 at the curve as prompted by the flashing vehicle light 460.

Figure 6:
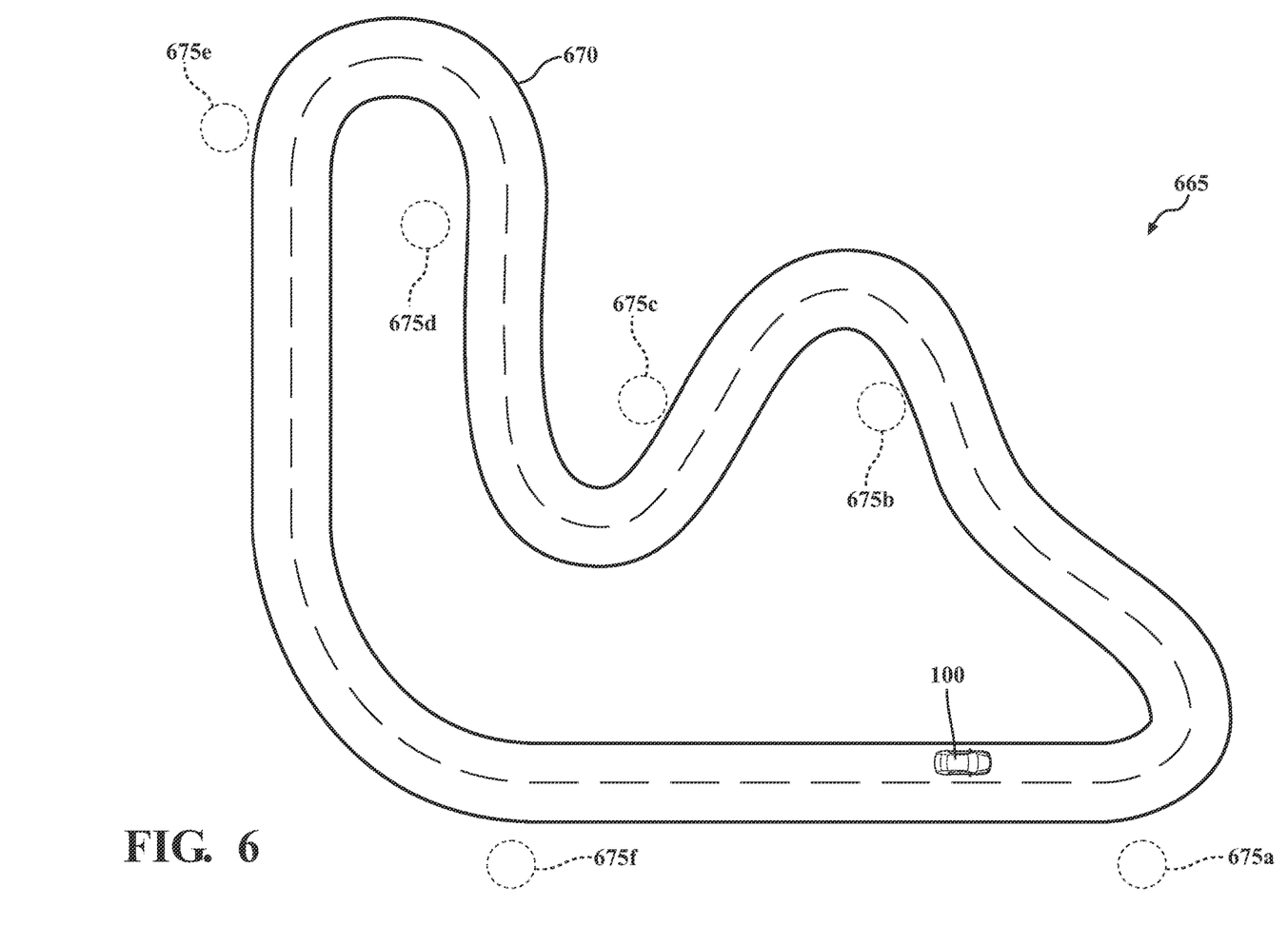
FIG. 6 illustrates a map of a roadway that indicates target locations for driving maneuvers to be performed.

FIG. 6 illustrates a map 665 of a roadway 670 that indicates target locations 675a, 675b, 675c, 675d, 675e, and 675f where driving maneuvers are to be performed. As described above, the vehicle 100 is near a first target location 675a as determined by the detection module 220 relying on sensor data 250 and map data 255. Based on this determination, the command module 230 generates a vehicle light control for a vehicle light 460 to prompt the particular driving maneuver to be executed at the first target location 675a. In this way, the disclosed systems, methods, and other embodiments improve driver training by exploiting a driver's natural sensitivity to changes in lighting conditions to cue certain driving maneuvers.

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 110. In one or more arrangements, the processor(s) 110 can be a primary/centralized processor of the vehicle 100 or may be representative of many distributed processing units. For instance, the processor(s) 110 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the vehicle 100.

The vehicle 100 can include one or more data stores 115 for storing one or more types of data. The data store 115 can be comprised of volatile and/or non-volatile memory. Examples of memory that may form the data store 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 115 is a component of the processor(s) 110. In general, the data store 115 is operatively connected to the processor(s) 110 for use thereby. The term "operatively connected," as used throughout this description, can include direct or indirect connections, including connections without direct physical contact.

In one or more arrangements, the one or more data stores 115 include various data elements to support functions of the vehicle 100, such as semi-autonomous and/or autonomous functions. Thus, the data store 115 may store map data 116 and/or sensor data 119. The map data 116 includes, in at least one approach, maps of one or more geographic areas. In some instances, the map data 116 can include information about roads (e.g., lane and/or road maps), traffic control devices, road markings, structures, features, and/or landmarks in the one or more geographic areas. The map data 116 may be characterized, in at least one approach, as a high-definition (HD) map that provides information for autonomous and/or semi-autonomous functions.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. In one or more arrangements, the map data 116 includes one or more static obstacle maps 118. The static obstacle map(s) 118 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 119 is data provided from one or more sensors of the sensor system 120. Thus, the sensor data 119 may include observations of a surrounding environment of the vehicle 100 and/or information about the vehicle 100 itself. In some instances, one or more data stores 115 located onboard the vehicle 100 store at least a portion of the map data 116 and/or the sensor data 119. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 120 and/or the one or more sensors can be operatively connected to the processor(s) 110, the data store(s) 115, and/or another element of the vehicle 100

Various examples of different types of sensors will be described herein. However, it will be understood that the embodiments are not limited to the particular sensors described. In various configurations, the sensor system 120 includes one or more vehicle sensors 121 and/or one or more environment sensors. The vehicle sensor(s) 121 function to sense information about the vehicle 100 itself. In one or more arrangements, the vehicle sensor(s) 121 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 120 can include one or more environment sensors 122 that sense a surrounding environment (e.g., external) of the vehicle 100 and/or, in at least one arrangement, an environment of a passenger cabin of the vehicle 100. For example, the one or more environment sensors 122 sense objects in the surrounding environment of the vehicle 100. Such obstacles may be stationary objects and/or dynamic objects. Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 includes one or more radar sensors 123, one or more LIDAR sensors 124, one or more sonar sensors 125 (e.g., ultrasonic sensors), and/or one or more cameras 126 (e.g., monocular, stereoscopic, RGB, infrared, etc.).

Continuing with the discussion of elements from FIG. 1, the vehicle 100 can include an input system 130. The input system 130 generally encompasses one or more devices that enable the acquisition of information by a machine from an outside source, such as an operator. The input system 130 can receive an input from a vehicle passenger (e.g., a driver/operator and/or a passenger). Additionally, in at least one configuration, the vehicle 100 includes an output system 135. The output system 135 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 140. Various examples of the one or more vehicle systems 140 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 141, a braking system 142, a steering system 143, a throttle system 144, a transmission system 145, a signaling system 146, and a navigation system 147.

The navigation system 147 can include one or more devices, applications, and/or combinations thereof to determine the geographic location of the vehicle 100 and/or to determine a travel route for the vehicle 100. The navigation system 147 can include one or more mapping applications to determine a travel route for the vehicle 100 according to, for example, the map data 116. The navigation system 147 may include or at least provide a connection to a global positioning system, a local positioning system, or a geolocation system.

In one or more configurations, the vehicle systems 140 function cooperatively with other components of the vehicle 100. For example, the processor(s) 110, the light control system 170, and/or automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the navigation and/or maneuvering of the vehicle 100. The processor(s) 110, the light control system 170, and/or the automated driving module(s) 160 may control some or all of these vehicle systems 140.

For example, when operating in the autonomous mode, the processor(s) 110, and/or the automated driving module (s) 160 control the heading and speed of the vehicle 100. The processor(s) 110, and/or the automated driving module(s) 160 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 100 includes one or more actuators 150 in at least one configuration. The actuators 150 are, for example, elements operable to move and/or control a mechanism, such as one or more of the vehicle systems 140 or components thereof responsive to electronic signals or other inputs from the processor(s) 110 and/or the automated driving module(s) 160. The one or more actuators 150 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 110, implement one or more of the various functions described herein. In various arrangements, one or more of the modules are a component of the processor(s) 110, or one or more of the modules are executed on and/or distributed among other processing systems to which the processor(s) 110 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 160. The automated driving module(s) 160, in at least one approach, receive data from the sensor system 120 and/or other systems associated with the vehicle 100. In one or more arrangements, the automated driving module(s) 160 use such data to perceive a surrounding environment of the vehicle 100. The automated driving module(s) 160 determine a position of the vehicle 100 in the surrounding environment and map aspects of the surrounding environment. For example, the automated driving module(s) 160 determines the location of obstacles or other environmental features including traffic signs, trees, shrubs, neighboring vehicles, pedestrians, etc.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or another source. In general, the automated driving module(s) 160 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™M, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
   a processor; and
   a memory storing machine-readable instructions that, when executed by the processor, cause the processor to:
      extract from a vehicle data store, vehicle sensor data from vehicle-mounted sensors, the vehicle sensor data indicates a vehicle location along a roadway;
      compare the vehicle sensor data to map data for the roadway, the map data indicates a driving maneuver to be performed at a target location;
      extract from the map data, a vehicle light setting specific to the driving maneuver from amongst a set of location-specific vehicle light settings, the vehicle light setting is stored in the map data; and
      when the vehicle location is within a threshold distance from the target location, transmit an electrical signal to control a vehicle light based on the vehicle light setting specific to the driving maneuver.

2. The system of claim 1, wherein the machine-readable instructions further comprise an instruction that, when executed by the processor, causes the processor to return the vehicle light to a pre-maneuver state based on the vehicle location passing the target location.

3. The system of claim 1, wherein the machine-readable instructions further comprise an instruction that, when executed by the processor, causes the processor to return the vehicle light to a pre-maneuver state based on a driver performing the driving maneuver.

4. The system of claim 1, wherein the machine-readable instruction to control the vehicle light comprises an instruction that, when executed by the processor, causes the processor to control the vehicle light based on a difference between the driving maneuver and a user command.

5. The system of claim 1, wherein the machine-readable instructions further comprise an instruction that, when executed by the processor, causes the processor to interrupt vehicle light control based on the vehicle light setting responsive to a driver executing the driving maneuver at the target location.

6. The system of claim 1, wherein the machine-readable instruction to monitor the vehicle location further comprises at least one of:
   an instruction that, when executed by the processor, causes the processor to compare data from environmental sensors of a vehicle to environmental data in the map to determine when the vehicle location is within the threshold distance from the target location;
   an instruction that, when executed by the processor, causes the processor to compare coordinate data of the vehicle to coordinate data for the target location to determine when the vehicle location is within the threshold distance from the target location; and
   an instruction that, when executed by the processor, causes the processor to monitor the vehicle location based on data received through a vehicle-to-infrastructure communication.

7. The system of claim 1, wherein the driving maneuver is a historically-collected driving maneuver based on collected data from a user navigating the roadway.

8. The system of claim 1, wherein the driving maneuver is a model-based driving maneuver based on a machine-learning simulated navigation of the roadway.

9. The system of claim 1, wherein the vehicle light is at least one of:
   an interior light of a vehicle; and
   an exterior light of the vehicle.

10. The system of claim 1, wherein:
   the machine-readable instructions further comprise instructions that, when executed by the processor, cause the processor to extract from the map data, an intensity of the driving maneuver; and
   the machine-readable instruction to transmit the electrical signal to control the vehicle comprises a machine-readable instruction that causes the processor to transmit the electrical signal to further control the vehicle light based on a difference between the intensity of the driving maneuver and a user command during the driving maneuver.

11. A non-transitory machine-readable medium comprising instructions that, when executed by a processor, cause the processor to:
   extract from a vehicle data store, vehicle sensor data from vehicle-mounted sensors, the vehicle sensor data indicates a vehicle location along a roadway;
   compare the vehicle sensor data to map data for the roadway, the map data indicates a driving maneuver to perform at a target location;
   extract from the map data, a vehicle light setting specific to the driving maneuver from amongst a set of location-specific vehicle light settings, the vehicle light setting is stored in the map data; and
   when the vehicle location is within a threshold distance from the target location, transmit an electrical signal to control a vehicle light based on the vehicle light setting specific to the driving maneuver.

12. The non-transitory machine-readable medium of claim 11, wherein the machine-readable medium further comprises an instruction that, when executed by the processor, causes the processor to interrupt vehicle light control based on the vehicle light setting responsive to a driver executing a driving maneuver at a target location.

13. The non-transitory machine-readable medium of claim 11, wherein the instruction to control a vehicle light comprises an instruction that, when executed by the processor, causes the processor to control the vehicle light based on a difference between a driving maneuver and a user command.

14. The non-transitory machine-readable medium of claim 11, wherein the machine-readable medium further comprises an instruction that, when executed by the processor, causes the processor to return the vehicle light to a pre-maneuver state based on at least one of the vehicle location passing the target location or a driver performing a driving maneuver.

15. The non-transitory machine-readable medium of claim 11, wherein:
   the machine-readable medium further comprises instructions that, when executed by the processor, cause the processor to extract from the map data, an intensity of the driving maneuver; and
   the instruction to transmit the electrical signal to control the vehicle comprises an instruction that causes the processor to transmit the electrical signal to further control the vehicle light based on a difference between the intensity of the driving maneuver and a user command during the driving maneuver.

16. A method, comprising:
   extracting from a vehicle data store, vehicle sensor data from vehicle-mounted sensors, the vehicle sensor data indicates a vehicle location along a roadway;
   comparing the vehicle sensor data to map data for the roadway, the map data indicates a driving maneuver to be performed at a target location;
   extracting from the map data, a vehicle light setting specific to the driving maneuver from amongst a set of location-specific vehicle light settings, the vehicle light setting is stored in the map data; and
   when the vehicle location is within a threshold distance from the target location, transmitting an electrical signal to control a vehicle light based on the vehicle light setting specific to the driving maneuver.

17. The method of claim 16, further comprising interrupting vehicle light control based on the vehicle light setting responsive to a driver executing the driving maneuver at the target location.

18. The method of claim 16, further comprising returning the vehicle light to a pre-maneuver state based on the vehicle location passing the target location.

19. The method of claim 16, further comprising returning the vehicle light to a pre-maneuver state based on a driver performing the driving maneuver.

20. The method of claim 16, wherein controlling a vehicle light comprises controlling the vehicle light based on a difference between the driving maneuver and a user command.

* * * * *